(12) United States Patent
Haswell

(10) Patent No.: US 11,113,205 B2
(45) Date of Patent: Sep. 7, 2021

(54) DIE ADDRESSING USING A REDUCED SIZE TRANSLATION TABLE ENTRY

(71) Applicant: Micron Technology, Inc., Boise, ID (US)

(72) Inventor: Jonathan M. Haswell, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 163 days.

(21) Appl. No.: 15/664,352

(22) Filed: Jul. 31, 2017

(65) Prior Publication Data

US 2019/0034348 A1 Jan. 31, 2019

(51) Int. Cl.
*G06F 12/1009* (2016.01)
*G06F 12/02* (2006.01)

(52) U.S. Cl.
CPC ...... *G06F 12/1009* (2013.01); *G06F 12/0246* (2013.01); *G06F 2212/65* (2013.01); *G06F 2212/7201* (2013.01); *G06F 2212/7203* (2013.01)

(58) Field of Classification Search
None
See application file for complete search history.

(56) References Cited

U.S. PATENT DOCUMENTS

| 5,948,082 | A | * | 9/1999 | Ichikawa | ............. | G06F 3/0676 |
| | | | | | | 710/52 |
| 7,251,653 | B2 | | 7/2007 | Huang et al. | | |
| 8,321,652 | B2 | | 11/2012 | Hinz | | |
| 8,724,401 | B2 | * | 5/2014 | Friendshuh | ........ | G11C 16/0483 |
| | | | | | | 365/185.33 |
| 8,838,937 | B1 | * | 9/2014 | Katz | .................... | G06F 12/0246 |
| | | | | | | 711/103 |
| 8,996,796 | B1 | | 3/2015 | Karamcheti et al. | | |
| 9,229,876 | B2 | | 1/2016 | Slepon | | |
| 2010/0274961 | A1 | | 10/2010 | Golla et al. | | |
| 2011/0271039 | A1 | * | 11/2011 | Baek | .................. | G06F 12/0246 |
| | | | | | | 711/103 |
| 2013/0046953 | A1 | | 2/2013 | Iyer et al. | | |

(Continued)

FOREIGN PATENT DOCUMENTS

TW    I490875 B    7/2015
TW    I578156 B    4/2017

OTHER PUBLICATIONS

International Search Report and Written Opinion from related international application No. PCT/US2018/044036, dated Nov. 8, 2018, 15 pp.

(Continued)

*Primary Examiner* — Gary W. Cygiel
(74) *Attorney, Agent, or Firm* — Brooks, Cameron & Huebsch, PLLC

(57) ABSTRACT

An example apparatus for die addressing can include an array of memory cells and a memory cache. The memory cache can be configured to store at least a portion of an address mapping table. The address mapping table can include entries that map translation units (TUs) to physical locations in the array. The entries can include data that indicate a location within the array that stores a particular TU without including data that indicates which die of the array the TU is stored in.

23 Claims, 4 Drawing Sheets

(56) References Cited

U.S. PATENT DOCUMENTS

| | | | |
|---|---|---|---|
| 2014/0153333 A1* | 6/2014 | Avila | G11C 16/3445 |
| | | | 365/185.11 |
| 2015/0074486 A1 | 3/2015 | Gaertner et al. | |
| 2015/0089183 A1 | 3/2015 | Bains et al. | |
| 2016/0210241 A1* | 7/2016 | Jacobs | G06F 12/0246 |
| 2017/0017588 A1 | 1/2017 | Frid et al. | |
| 2017/0206170 A1 | 7/2017 | Jacobs et al. | |

OTHER PUBLICATIONS

Office Action from related Taiwanese Patent Application No. 107126493, dated Jul. 5, 2019, 16 pages.
Decision of Rejection from related Taiwanese Patent Application No. 107126493, dated Oct. 16, 2019, 8 pages.
European Search Report from related European Patent Application Serial No. 18841046.8, dated Apr. 14, 2021, 9 pages.

\* cited by examiner

DIE ADDRESSING USING A REDUCED SIZE TRANSLATION TABLE ENTRY

TECHNICAL FIELD

The present disclosure relates generally to semiconductor memory and methods, and more particularly, to die addressing.

BACKGROUND

Memory devices are typically provided as internal, semiconductor, integrated circuits and/or external removable devices in computers or other electronic devices. There are many different types of memory including volatile and non-volatile memory. Volatile memory can require power to maintain its data and can include random-access memory (RAM), dynamic random access memory (DRAM), and synchronous dynamic random access memory (SDRAM), among others. Non-volatile memory can retain stored data when not powered and can include NAND flash memory, NOR flash memory, phase change random access memory (PCRAM), resistive random access memory (RRAM), and magnetic random access memory (MRAM), among others.

Memory devices can be combined together to form a solid state drive (SSD). An SSD can include non-volatile memory (e.g., NAND flash memory and/or NOR flash memory), and/or can include volatile memory (e.g., DRAM and/or SRAM), among various other types of non-volatile and volatile memory. Flash memory devices can include memory cells storing data in a charge storage structure such as a floating gate, for instance, and may be utilized as non-volatile memory for a wide range of electronic applications. Flash memory devices typically use a one-transistor memory cell that allows for high memory densities, high reliability, and low power consumption.

Flash memory devices can be utilized as volatile and non-volatile memory for a wide range of electronic applications. Flash memory devices typically use a one-transistor memory cell that allows for high memory densities, high reliability, and low power consumption. Flash memory devices often may have a "NAND" or "NOR" memory array architecture, so called for the logical form in which the basic memory cell configuration of each is arranged. Uses for flash memory include memory for solid state drives (SSDs), personal computers, personal digital assistants (PDAs), digital cameras, cellular telephones, portable music players (e.g., MP3 players), and movie players, among other electronic devices. Data, such as program code, user data, and/or system data, such as a basic input/output system (BIOS), are typically stored in flash memory devices.

A flash memory device may include a flash transition layer (FTL) that can be used (e.g., during a programming operation performed on the flash memory device) to map logical addresses to physical addresses in the flash memory (e.g., via a logical to physical (L2P) table). However, the size of (e.g., the amount of data stored in) address mapping tables used in previous FTL approaches may be fixed and become very large as the size of the memory (e.g., non-volatile storage array, NAND) to be mapped becomes larger. Main memory (such as in DRAM) can be expensive and space may be limited. As in previous approaches, a fixed, large address mapping table can be difficult to fit into an already limited amount of memory (e.g., non-volatile storage array, NAND) space. The larger the address mapping table, the more difficult it can be to fit a portion of the address mapping table into a cache without affecting a cache hit rate. Further, as the size of memory mapped by the FTL increases, the size of the address mapping table may increase to a size that becomes difficult to manage.

DETAILED DESCRIPTION

Figure 1:
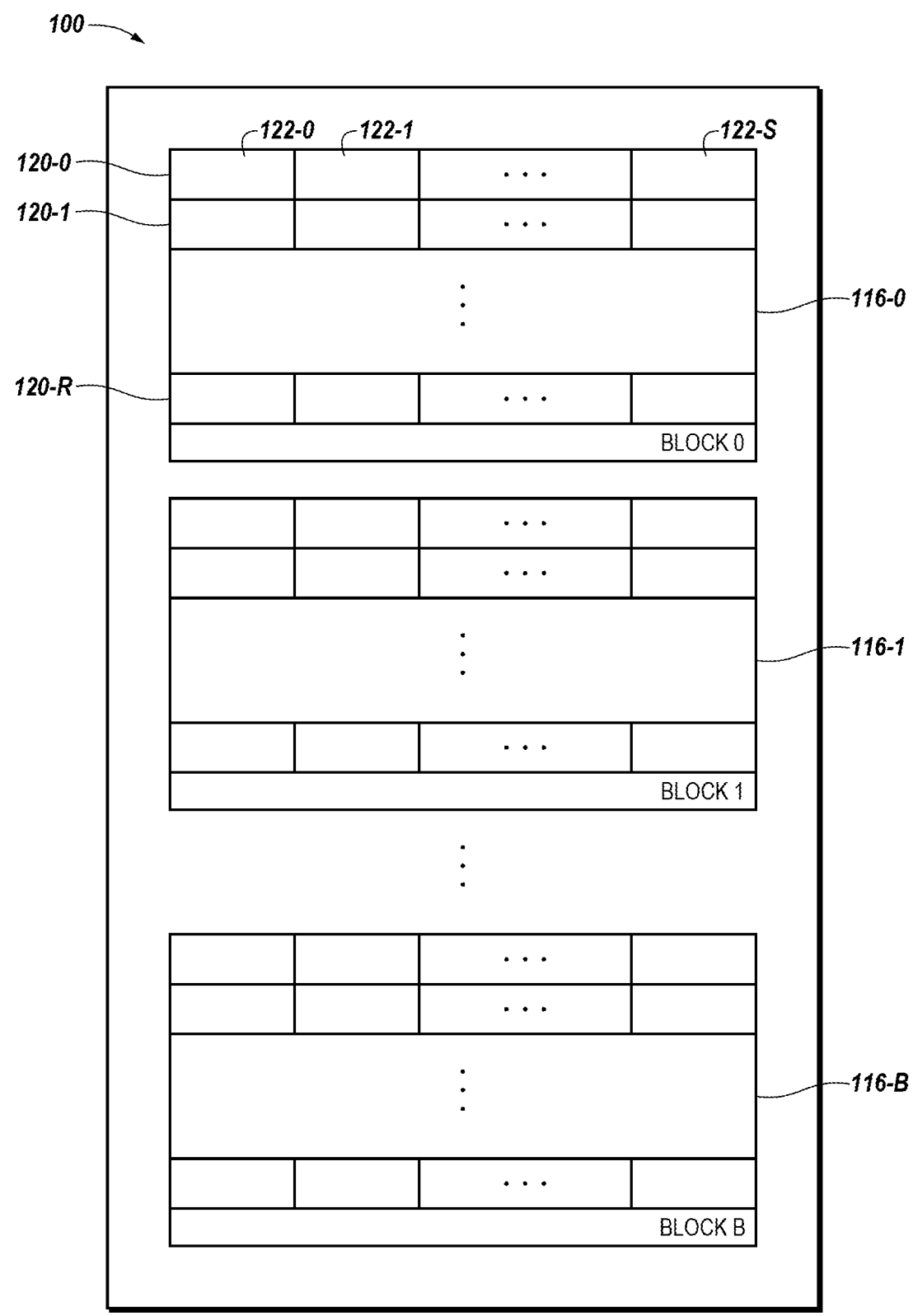
FIG. 1 illustrates a diagram of a portion of a memory array having a number of physical blocks in accordance with a number of embodiments of the present disclosure.

An example apparatus for die addressing can include an array of memory cells and a memory cache. The memory cache can be configured to store at least a portion of an address mapping table. The address mapping table can include entries that map translation units (TUs) to physical locations in the array. As used herein, a TU can refer to a unit of translation, or a management unit, for purposes of transferring and monitoring data. The entries can include data that indicate a location within the array that stores a particular TU without including data that indicates which die of the array the TU is stored in.

Embodiments of the present disclosure can include flash translation layers having tables (e.g., address mapping tables) of a particular size. As the memory mapped by the tables increases in size, the size of the tables can likewise increase, and can become prohibitive. For example, the size of (e.g., the amount of data stored in) the tables in flash translation layers can become too large and/or unmanageable.

As an example, in some previous approaches, an entry in a logical-to-physical (L2P) address mapping table can include a reference to a die, block, plane, and page of memory that a portion of data is stored in. Further, a die can include a number of planes, the number of planes can each include a number of blocks, and the number of blocks can each include a number of pages. As the portions of data can be written to any number of dies and, in the case of a portion of data written at the end and/or beginning of a die, across multiple dies in these previous approaches, the entry in the address mapping table can indicate which die the portion of data is written to, adding length to the entry. As the memory (e.g., non-volatile storage array, NAND) expands, the entry in the address mapping table pointing to a die can also increase (e.g., more bits per entry to point to a die). As an example, in a main memory with 1024 die, 10 bits per entry would be used to identify which die the portion of data is stored in. Increasing the number of die would increase the number of bits in the entry.

Embodiments of the present disclosure can include determining a particular die to write each of the TUs to based on a hash function. As used herein, a TU is a unit of translation, or a management unit for purposes of transferring and monitoring data. The hash function can also be used to locate which die a TU is stored in. As used in some previous approaches, which die to write a TU to can be encoded in data of a corresponding entry in a mapping table. By using the hash function, the data that indicated which die in previous approaches can be removed and a size of the entry can be reduced. In this way, a particular TU can be written to a particular die without writing the particular TU to span across multiple dies. Each TU can be made up of a single logical block address (LBA) or more than one LBA. In addition, by using the hash function to more randomly choose a die among multiple die to write a translation unit to, the wear on any particular die of the multiple die can be spread out more evenly.

In this way, a size of each mapping entry associated with each TU can be reduced and the overall size of the mapping table can be reduced in kind. As memory drives continue to increase in size, a method to reduce the size of an address mapping table can allow for larger memory drive sizes without a corresponding increase in the address mapping table used to map a logical address to a physical address. In this way, physical memory space used for storing address mapping tables can be minimized and the scalability of the address mapping tables can be increased.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As used herein, "a number of" something can refer to one or more such things. For example, a number of memory cells can refer to one or more memory cells. Additionally, the designator "N", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, 324 may reference element "24" in FIG. 3, and a similar element may be referenced as 424 in FIG. 4. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure, and should not be taken in a limiting sense.

FIG. 1 illustrates a diagram of a portion of a memory array 100 having a number of physical blocks in accordance with one or more embodiments of the present disclosure. Memory array 100 can be, for example, a NAND or NOR flash non-volatile memory array. However, embodiments of the present disclosure are not limited to a particular type of memory array. Further, although not shown in FIG. 1, one of ordinary skill in the art will appreciate that memory array 100 can be located on a particular semiconductor die, or constructed across multiple semiconductor dies, along with various peripheral circuitry associated with the operation thereof.

As shown in FIG. 1, memory array 100 has a number of physical blocks 116-0 (BLOCK 0), 116-1 (BLOCK 1), . . . , 116-B (BLOCK B) of memory cells. The memory cells can be single level cells and/or multilevel cells. As an example, the number of physical blocks in memory array 100 may be 128 blocks, 512 blocks, or 1,024 blocks, but embodiments are not limited to a particular multiple of 128 or to any particular number of physical blocks in memory array 100.

In the example shown in FIG. 1, each physical block 116-0, 116-1, . . . , 116-B includes memory cells which can be erased together as a unit (e.g., the cells in each physical block can be erased in a substantially simultaneous manner). For instance, the memory cells in each physical block can be erased together in a single erase operation.

As shown in FIG. 1, each physical block 116-0, 116-1, . . . , 116-B contains a number of physical rows (e.g., 120-0, 120-1, . . . , 120-R) of memory cells coupled to access lines (e.g., word lines). The number of rows (e.g., word lines) in each physical block can be 32, but embodiments are not limited to a particular number of rows 120-0, 120-1, . . . , 120-R per physical block.

As one of ordinary skill in the art will appreciate, each row 120-0, 120-1, . . . , 120-R can include (e.g., store) one or more physical pages of data. A physical page refers to a unit of programming and/or sensing (e.g., a number of cells that are programmed and/or sensed together as a functional group of memory cells). In the embodiment shown in FIG. 1, each row 120-0, 120-1, . . . , 120-R stores one page of data. However, embodiments of the present disclosure are not so limited. For instance, in one or more embodiments of the present disclosure, each row can store multiple pages of data, with one or more even pages of data associated with even-numbered bit lines, and one or more odd pages of data associated with odd numbered bit lines. Additionally, for embodiments including multilevel cells, a physical page can be logically divided into an upper page and a lower page of data, with each cell in a row contributing one or more bits towards an upper page of data and one or more bits towards a lower page of data. In one or more embodiments, a memory array can include multiple physical blocks of memory cells and each physical block can be organized into multiple pages.

In one or more embodiments of the present disclosure, and as shown in FIG. 1, a page associated with a row can store data (e.g., after a programming operation) referred to as translation units (TUs) 122-0, 122-1, . . . , 122-S. Each TU 122-0, 122-1, . . . , 122-S can be stored in a portion of a page 120-0, 120-1, . . . , 120-R that corresponds to one or more logical portions of data. For example, a particular TU can correspond to a particular logical sector that is stored in a page, for example, as TUs 122-0 to 122-S are illustrated as being stored in page 120-0.

Each TU 122-0, 122-1, . . . , 122-S stored in page 120-0 will have a physical identifier, such as, for example, a physical block number (PBN), associated therewith. The PBN associated with a TU 122-0 to 122-S identifies the actual physical location of the sector within memory array 100. For example, a PBN can identify a CE#, LUN, plane, block, page, position, and/or status. Further, a number of PBNs can map onto a physical page of memory cells in memory array 100. For example, one, two or four PBNs can map onto a physical page, depending on what the type of memory array 100 is. In a number of embodiments, a block refers to a group of memory cells that are erased together as a unit. A number of blocks can be included in a plane of memory cells and an array can include a number of planes. As one example, a memory device may be configured to store 8 KB (kilobytes) of user data per page, 128 pages of user data per block, 2048 blocks per plane, and 16 planes per device.

In this example, a TU is being used as a unit of translation, or a management unit for purposes of transferring and monitoring data. Each TU can be made up of a single logical block address (LBA) or more than one LBA. As one of ordinary skill in the art will appreciate, logical block addressing is a scheme that can be used by a host for identifying a logical sector of data. For example, each logical sector can correspond to a unique logical block address (LBA). Additionally, an LBA may also correspond to a physical address. As an example, a logical sector of data can be a number of bytes of data (e.g., 256 bytes, 512 bytes, or 1,024 bytes). However, embodiments are not limited to these examples.

In one or more embodiments of the present disclosure, a number of TUs can correspond to a logical page number (LPN). For example, a number of TUs (e.g., a number of logical sectors of data) can correspond to an LPN (e.g., a number of logical sectors of data). For example, one or more LPNs can map logically into one TU, depending on the size of the TU and/or LPN(s). It is noted that other configurations for the physical blocks 116-0, 116-1, . . . , 116-B, rows 120-0, 120-1, . . . , 120-R, TUs 122-0, 122-1, . . . , 122-S, and pages are possible. For example, rows 120-0, 120-1, . . . , 120-R of physical blocks 116-0, 116-1, . . . , 116-B can each store data corresponding to TUs which can include, for example, more or less than 512 bytes of data.

Figure 2:
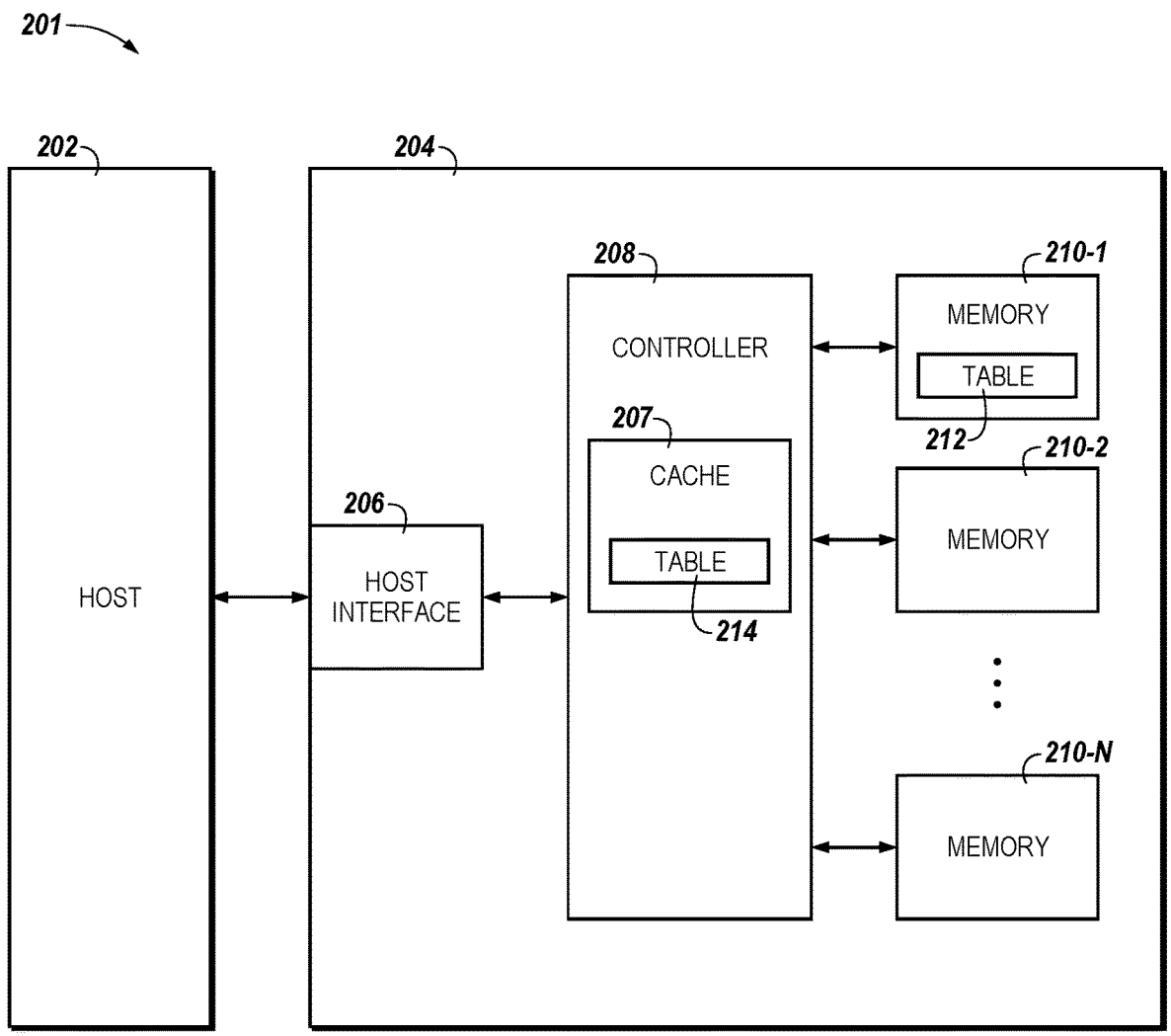
FIG. 2 is a block diagram of an apparatus in the form of a computing system comprising a memory system in accordance with a number of embodiments of the present disclosure.

FIG. 2 is a block diagram of an apparatus in the form of a computing system 201 comprising a memory system 204 in accordance with a number of embodiments of the present disclosure. As used herein, a memory system, controller, and/or memory device may separately be referred to as an "apparatus". Memory system 204 can be, for example, a solid state drive (SSD). In the embodiment illustrated in FIG. 2, memory system 204 includes a host interface 206, a memory (e.g., a number of memory devices 210-1, 210-2, . . . , 210-N), and a controller 208 (e.g., an SSD controller) coupled to physical host interface 206 and memory devices 210-1, 210-2, . . . , 210-N.

Memory devices 210-1, 210-2, . . . , 210-N (referred to collectively as memory devices 210 or memory 210) can include, for example, a number of non-volatile memory arrays (e.g., arrays of non-volatile memory cells). For instance, memory devices 210 can include a number of memory arrays analogous to memory array 100 previously described in connection with FIG. 1. Memory device 210-1 can include a table 212 that is stored within memory device 210-1. In some embodiments, the table 212 can be an address mapping table that corresponds to all memory (e.g., memory devices 210) and includes logical to physical mapping of all memory.

Controller 208 can include a cache 207 (e.g., a memory cache using DRAM or SRAM to store data) that stores a table 214. The table 214 can include at least a portion of an address mapping table (e.g., an L2P table). For example, the cache 207 can store one or more portions of an address mapping table (e.g., table 212) loaded thereto. Portions of the address mapping table 212 can correspond to respective physical regions of the memory (e.g., 210-1 to 210-N) mapped by table 212 (described further below in association with FIG. 3). As memory space of cache 207 may be limited, the one or more portions loaded to table 214 may be limited. By reducing the size of each entry within the address mapping table 212, and therefore what is loaded into table 214, more physical to logical (L2P) mapping data can be stored in table 214. As described further below, by storing data (such as a TU) in a particular die and not using additional bits of data to indicate which die the data is stored in, an entry of an address mapping table (such as table 212 and portions stored to table 214) can be reduced. As an example, the entry in the table 212 can include data indicating a plane, a block, and a page where data associated with the entry is located without including data to indicate which die stores the data.

In some embodiments, the memory devices 210 can include a number of arrays of memory cells (e.g., non-volatile memory cells). The arrays can be flash arrays with a NAND architecture, for example. However, embodiments are not limited to a particular type of memory array or array architecture. As described above in connection with FIG. 1, the memory cells can be grouped, for instance, into a number of blocks including a number of physical pages of memory cells. In a number of embodiments, a block refers to a group of memory cells that are erased together as a unit. A number of blocks can be included in a plane of memory cells and an array can include a number of planes. As one example, a memory device may be configured to store 8 KB (kilobytes) of user data per page, 128 pages of user data per block, 2048 blocks per plane, and 16 planes per device.

In operation, data can be written to and/or read from a memory device of a memory system (e.g., memory devices 210 of memory system 204) as a page of data, for example. As such, a page of data can be referred to as a data transfer size of the memory system. Data can be transferred to/from a host 202) in data segments referred to as sectors (e.g., host sectors). As such, a sector of data can be referred to as a data transfer size of the host. In some embodiments, NAND blocks may be referred to as erase blocks, with blocks being a unit of erasure and pages being a measure of reads and/or writes.

Host interface 206 can be used to communicate information between memory system 204 and another device such as a host 202. Host 202 can include a memory access device (e.g., a processor). As used herein, "a processor" can intend a number of processors, such as a parallel processing system, a number of coprocessors, etc. Example hosts can include personal laptop computers, desktop computers, digital cameras, digital recording and playback devices, mobile (e.g., smart) phones, PDAs, memory card readers, interface hubs, and the like.

Host interface 206 can be in the form of a standardized physical interface. For example, when memory system 204 is used for information storage in computing system 201, host interface 206 can be a serial advanced technology attachment (SATA) physical interface, a peripheral component interconnect express (PCIe) physical interface, or a universal serial bus (USB) physical interface, among other physical connectors and/or interfaces. In general, however, host interface 206 can provide an interface for passing control, address, information (e.g., data), and other signals between memory system 204 and a host (e.g., host 202) having compatible receptors for host interface 206.

Controller 208 can include, for example, control circuitry and/or logic (e.g., hardware and firmware). Controller 208 can be included on the same physical device (e.g., the same die) as memories 210-1, 210-2, . . . , 210-N. For example, controller 208 can be an application specific integrated circuit (ASIC) coupled to a printed circuit board including physical host interface 206 and memories 210-1, 210-2, . . . , 210-N. Alternatively, controller 208 can be included on a separate physical device that is communicatively coupled to the physical device that includes memories 210-1, 210-2, . . . , 210-N. In a number of embodiments, components of controller 208 can be spread across multiple physical devices (e.g., some components on the same die as the memory, and some components on a different die, module, or board) as a distributed controller.

Controller 208 can communicate with memory devices 210 to sense (e.g., read), program (e.g., write), erase, and/or overwrite existing data with new data, among other operations. Controller 208 can have circuitry that may be a number of integrated circuits and/or discrete components. In a number of embodiments, the circuitry in controller 208 may include control circuitry for controlling access across memory devices 210 and/or circuitry for providing a translation layer (e.g., a flash translation layer) between host 202 and memory system 204.

Controller 208 can control operation of a dedicated region, such as a block addressing portion, of each respective memory device 210-1, 210-2, . . . , 210-N as a cache. A portion of each respective memory device 210-1, 210-2, . . . , 210-N can be, for example, a first plurality of blocks (e.g., physical blocks) of memory cells in each respective memory, as will be further described herein (e.g., in connection with FIG. 3), and may be referred to herein as a first portion of the memory. In addition, portions of each respective memory device 210-1, 210-2, . . . , 210-N can include a second plurality of blocks, a third plurality of blocks, etc.

The embodiment illustrated in FIG. 2 can include additional circuitry, logic, and/or components not illustrated so as not to obscure embodiments of the present disclosure. For example, memory device 204 can include address circuitry to latch address signals provided over I/O connectors through I/O circuitry. Address signals can be received and decoded by a row decoders and column decoders, to access memories 210-1, 210-2, . . . , 210-N.

Figure 3:
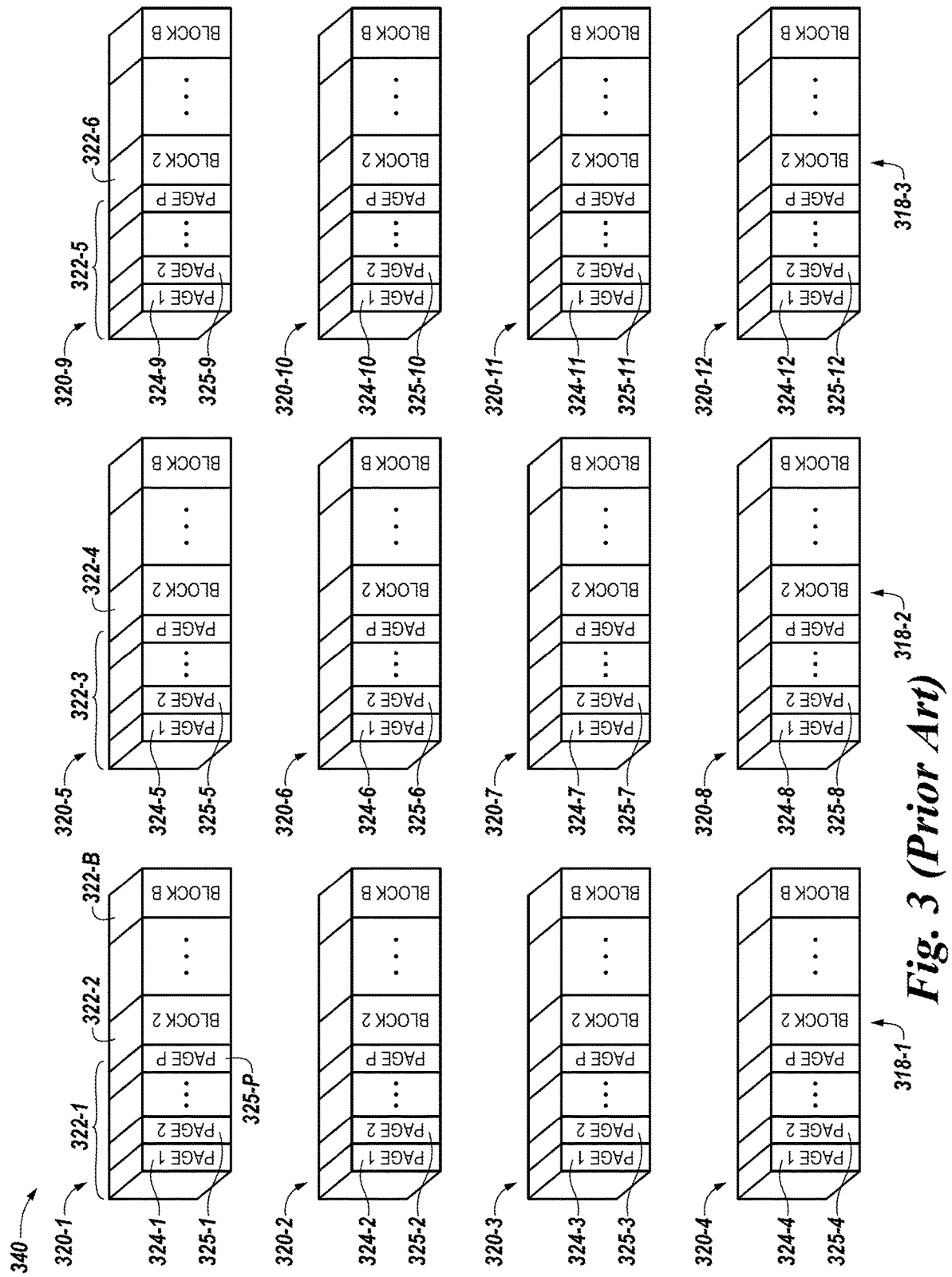
FIG. 3 illustrates a diagram of a memory system in accordance with a number of embodiments of the present disclosure.

FIG. 3 illustrates a block diagram of a memory system 340 in accordance with a number of embodiments of the present disclosure. FIG. 3 illustrates a number of memory dies 318-1, 318-2, 318-3 separated into portions of corresponding planes, blocks, and pages. In this example, the memory dies 318-1, 318-2, 318-3, which can be referred to herein as dies 318, each include four planes of memory. For example, die 318-1 includes planes 320-1, 320-2, 320-3, and 320-4. Die 318-2 includes planes 320-5, 320-6, 320-7, 320-8. Die 318-3 includes planes 320-9, 320-10, 320-11, 320-12. Memory planes 320-1 to 320-12 can be referred to herein as planes 320. Each plane 320 includes a number of blocks of memory (e.g., plane 320-1 of the die 318-1 includes blocks 322-1, 322-2, 322-B and plane 320-5 of the die 318-2 includes blocks 322-3, 322-4, etc.). A plane 320 can refer to a portion of a block of memory. As an example, a memory die 318 may be configured to store 8 KB (kilobytes) of user data per page, 128 pages of user data per block, 2048 blocks per plane, and 4 planes per die 318. As described herein, a block of memory cells can be erased together in one erase operation.

Each block includes a number of pages (e.g., pages 324-1, 325-1, 325-P included in block 322-1 of plane 320-1 of the die 318-1 and pages 324-5, 325-5 included in block 322-3 of plane 320-5 of the die 318-2). As described herein, a page of memory cells can be written or read together in one write or read operation. Each plane can be in bidirectional communication with a respective data register and each data register can be in bidirectional communication with a respective cache register. Data can be transferred from the respective data register to one of the memory planes 320 during write operations. Data can be transferred from one of the memory planes 320 to a data register during read operations. While illustrated with four planes, embodiments are not limited to a particular number of planes, nor a particular number of blocks per plane or number of pages per block.

Translation units (TUs) (e.g., TU 122-0, 122-1, etc. in FIG. 1) can be written from a host to portions of the memory system 340 in a particular physical order. For example, a first TU can be written to a page 324-1 of block 322-1 of a plane 320-1 of the die 318-1. A number of TUs can be written to the page 324-1 and, in response to a first portion of a TU being written to a page that does not fit additional portions of the TU, a second portion of the TU can continue to be written to a page 324-2 of the plane 320-2 of the die 318-1, and so forth. Therefore, data can be written across the page 324-1 of the plane 320-1, continue to be written to the page 324-2 in the plane 320-2, continue to be written to the page 324-3 in the plane 320-3, and continue to be written to the page 324-4 in the plane 320-4.

In some previous approaches, TUs are referenced using a physical address that includes an address portion for a die, an address portion for a block, an address portion for a plane, and an address portion for a page. Each address portion indicates where in the die/block/plane/page the TU should be written to. In these previous approaches, TUs can be written across each first page of each first block across each plane of each die before being written to a second page of each first block, etc. For example, TUs can be written to the page 324-4 in the plane 320-4 until a last TU whose first portion is written to a last portion of the page 324-4 and additional portions do not fit. The additional portions of the last TU can be written to a page 324-5 of a plane 320-5 of the die 318-2. Subsequent TUs can be written across the page 324-5, continue to the next page 324-6, continue to the next page 324-7, and continue to the next page 324-8. A last TU whose first portion is written at the end of the page 324-8 and whose additional portions do not fit can be written to a first page 324-9 of a plane 320-9 of the die 318-3.

In these previous approaches, as particular TUs can be written to any number of dies and, in the case of a TU written at the end and/or beginning of a die, across multiple dies, a TU can include an address portion in a mapping table that is associated with the respective particular TU that indicates which die(s) the TU is written to. For example, when writing data in a sequence across each first page of each first block of each of the four planes of each die before advancing to additionally numbered pages, TUs can span multiple dies. An address in the mapping table of a TU that spans more than one die would include an address portion that indicates which dies the data of the TU spans. In the alternative, an address in the mapping table of the TU that spans more than one die would include an address portion that indicates which die the data of the TU is initially written to and a subsequent die can be inferred as the dies the TU is written to can be in sequential order.

Figure 4:
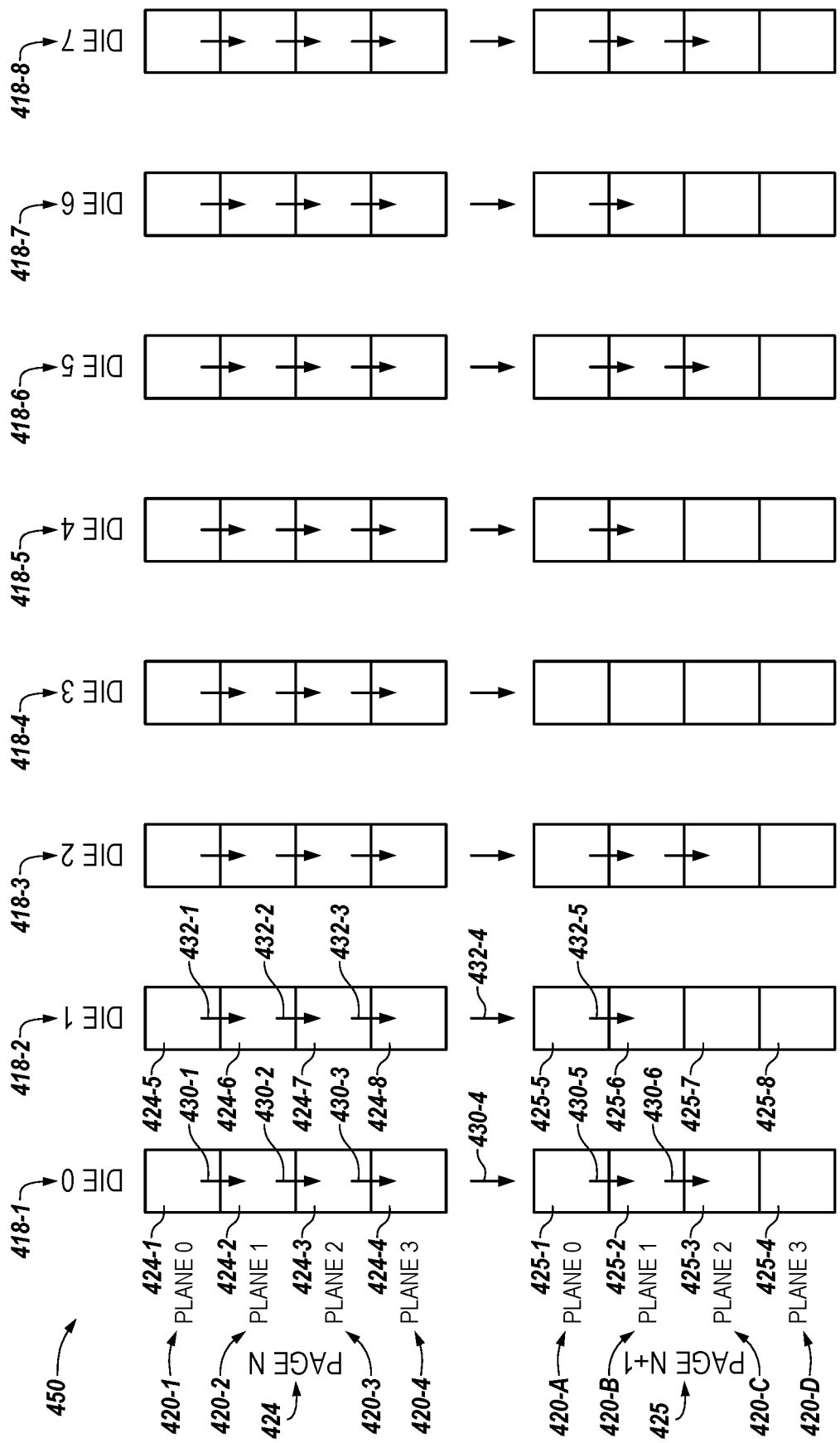
FIG. 4 illustrates a diagram of a memory system in accordance with a number of embodiments of the present disclosure.

As described herein in association with FIG. 4, an address portion in a mapping table may include an address for a particular block, plane, and page but may not include an address for a die. In this way, the address portion in a mapping table can be minimized in relation to previous approaches. In order to achieve this, a TU can be written to a particular die using a particular operation (e.g., a hash function) and, in at least one example, not span multiple dies. A die can be associated with a TU based on a particular operation (e.g., a hash function) performed to indicate which die the TU is written in.

FIG. 4 illustrates a diagram of a memory system 450 in accordance with a number of embodiments of the present disclosure. FIG. 4 illustrates how translation unit (TU) data can be written in a particular die such that each of the TUs written do not span more than one die. The TU data can be written to the particular die such that a portion of an address in a mapping table (e.g., table 212 in FIG. 2) associated with the TU data does not include a die address, thereby minimizing the size of the mapping table used. Additional ways of locating the TU in a die are described further below.

The memory system 450 can be a representation of the memory system 340 in FIG. 3 in that the memory system 340 can be a physical representation of how the data is stored and/or structured while memory system 450 can be a representation of those data locations for ease of illustration of how the data is written to the memory system 340. The memory system 450 can include a number of dies 418-1, 418-2, 418-3, 418-4, 418-5, 418-6, 418-7, . . . , 418-P. The number of dies 418-1 through 418-P can be referred to herein as dies 418 and correspond to dies 318 in FIG. 3. Each of the dies 418 can include a number of planes. For example, each of the dies 418 can include a first plane ("Plane 0") 420-1, a second plane ("Plane 1") 420-2, a third plane ("Plane 2") 420-3, and a fourth plane ("Plane 3") 420-4, which corresponds to a particular page ("Page N") 424. The planes 420-1 through 420-4 of the first die 418-1 correspond to planes 320-1 through 320-4 in FIG. 3. The planes 420-1 through 420-4 of the second die 418-2 correspond to planes 320-5 through 320-8 in FIG. 3, and so forth. For example, four planes 420-1, 420-2, 420-3, 420-4 are illustrated for all dies 418 in FIG. 4 for ease of illustration in FIG. 4 but each die has its own physical plane, as illustrated in FIG. 3.

For purposes of illustration, planes 420-1 through 420-4 correspond to first pages stored in each first block of each die (e.g., first block 322-1 of first plane 320-1 of first die 318-1 in FIG. 3, and so forth through each plane of each die), which is illustrated by Page N 424 in FIG. 4. More specifically, in relation to the first die (e.g., 318-1 in FIG. 3 and 418-1 in FIG. 4), first page 424-1 of plane 420-1 in FIG. 4 corresponds to page 324-1 in FIG. 3. First page 424-2 in plane 420-2 in FIG. 4 corresponds to page 324-2 in FIG. 3, first page 424-3 in plane 420-3 in FIG. 4 corresponds to page 324-3 in FIG. 3, and page 424-4 in plane 420-4 in FIG. 4 corresponds to page 324-4 in FIG. 3.

Further, planes 420-A through 420-D (also labeled as Plane 0 through Plane 3) are the same planes as planes 420-1 through 420-4. However, planes 420-1 through 420-4 correspond to first pages of a first block of each of the dies (e.g., pages 324-1 through 324-12 in FIG. 3) and planes 420-A through 420-D correspond to second pages of the first block of each of the dies (e.g., pages 325-1 through 325-12). For example, page 424-1 is a first page of a first block of a first plane 420-1, page 424-2 is a first page of a first block of a second plane 420-2, page 424-3 is a first page of a first block of a third plane 420-3, and page 424-3 is a first page of a first block of a fourth plane 420-4. Page 425-1 (e.g., page 325-1) is a second page of a first block of the first plane 420-A, page 425-2 (e.g., page 325-2) is a second page of a first block of the second plane 420-B, page 425-3 (e.g., page 325-3) is a second page of a first block of the third plane 420-C, and page 425-4 (e.g., page 325-4) is a second page of a first block of the fourth plane 420-D. Also, for ease of illustration, the memory system 450 illustrates a particular block (in this case a first block of each plane of each die) and, while additional blocks of each plane are not illustrated, a similar data writing pattern in each of the other blocks can be performed.

As an example of how the TUs are written, a first TU can be written sequentially first at the beginning of the first page 424-1 of plane 420-1. A first portion of TUs can be written subsequent to the first TU and can be written within the first page 424-1 and continue, as indicated by arrow 430-1, into first page 424-2 in the next plane 420-2. A second portion of TUs can be written across the first page 424-2 and continue, as indicated by arrow 430-2, into first page 424-3 in the next plane 420-3. A third portion of TUs can be written across the first page 424-3 and continue, as indicated by arrow 430-3, into first page 424-4 in the next plane 420-4. A fourth portion of TUs can be written across the first page 424-4 and, instead of being written into the first pages of the next die (which would include being written into pages 424-5, 424-6, 424-7, and 424-8), continue, as indicated by arrow 430-4, into second page 425-1 in the first plane 420-A (which is the same plane as plane 420-1). A fifth portion of TUs can be written across the second page 425-1 and continue, as indicated by arrow 430-5, into second page 425-2 in the second plane 420-B (which is the same plane as plane 420-2). A sixth portion of TUs can be written across the second page 425-2 and continue, as indicated by arrow 430-6, into second page 425-3.

In this way, the portions of TUs described above can all be written to a same die (e.g., die 418-1). Likewise, TUs written to the second die 418-2 can be written to first pages 424-6 through 424-8 and continue to be written across page 424-8 to second page 425-5 and continue to second page 425-6 (as indicated by arrows 432-1 through 432-5). Therefore, TUs do not span across more than one die and the die location of a TU can be determined without using an address portion that includes a die location. For example, the address portion of a mapping table associated with a TU can include an indication of which page, plane, and block the TU is located in and the die location can be determined without the address portion information. Further, each die can be written to independently and a write cursor per die can be created for writing pages within a block on a die without reference to a last page written to another die.

A determination can be made indicating which die each of the TUs should be written to. This determination can insure that the host performs an even number of writes to all dies so that the writing of the TUs is distributed more evenly across all dies. A hash operation can be performed on a TU address to select a die that the TU will be written to. The hash operation can include a simple non-cryptographic level hash. The hash operation can include a multiplication hash that uses one multiplication operation and one shift operation to perform the hash for each TU. While a hash function and/or a multiplication hash is described, examples are not so limited. Any number of hash and/or similar mathematical functions could be performed to determine which die a TU is written to and/or stored in. Using a hash operation to allocate TU to a particular die can divide a memory system into n number of individual sub-memories where n is the number of die. Dividing the memory system can be beneficial in that each die can maintain a particular amount of memory space for additional TUs to be written to. For example, no particular die may run out of space quicker than other dies and fill at a similar rate.

When additional memory space is to be allocated for additional TUs to be written, a block stripe can be allocated and each die in the block stripe can be written to independently based on the TUs allocated to it. A block stripe can refer to partitioning data across multiple blocks in multiple locations. For example, data can be stored across each first block of each die and the data across each of these first blocks can be referred to as a block stripe. This is similar to having a write cursor pointing to the block stripe but an actual point at which the TUs are written within each die is a separate sub-write cursor. When a block stripe is approaching storing TUs in all available memory space (e.g., the block stripe is reaching full capacity), the situation where not every die will write to its last page at the same time can be addressed. A first method to address this can include padding remaining pages in all other die when one die is full so that the block stripe can be closed immediately and a new block stripe can be opened for writing to. A second method to address this can include using a particular operation (e.g., a cuckoo hashing operation or similar operation) to provide alternate locations for TU to be written to the die that is full. A third method to address this can include starting a next block stripe before all die in the old block stripe are closed. A short time may pass before all die in the old block are closed, which may be a reason that this method is preferred.

In response to TUs being written to one die at a much higher rate than the other dies, despite the hashing function being used (e.g., if the hashing function is reversed), uneven wear leveling can be minimized by including a logical die number in addition to the physical die number determined using the hashing function. A mapping table can be maintained to store an offset per block stripe between the logical die number and the physical die number. TUs can be written by the host to a logical die number computed by a hash function. In response to detection of excessive wear on an individual die, the offset between the logical die number and the physical die number can be modified. Modifying the offset can shift subsequent writes to a different die and reduce the excessive wear on the individual die. Rather than monitor the wear on an individual die, the offset can be incremented at a particular interval to randomize the dies even further and avoid excessive wear.

As the size of memory increases, mapping tables can become overly large. As a size of each entry in the mapping table affects the overall size of the mapping table, reducing a size of each entry can allow for smaller mapping tables and more efficient use of memory space. For example, a memory drive of 8 TB of NAND memory may use 200 die. A memory drive of 50 to 100 TB regions may use upward of 800 die. In this example, a die address of a mapping table (e.g., a logical-to-physical mapping table) can be 8-10 bits, all of which may be eliminated by the description in association with FIGS. 3-4. Further, this could avoid going from 4 to 5 bytes per entry in the mapping table per TU as the size of the memory drives, and thereby the number of dies, increases (i.e., more dies would need more data bits to reference). In addition, the smaller mapping tables could afford an increase in the number of dies by providing additional memory space where the mapping table would have otherwise been stored.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   an array of memory cells comprising a plurality of dies; and
   a memory cache configured to store at least a portion of an address mapping table, wherein:
      the address mapping table comprises entries that map translation units (TUs) to physical locations in the array, and
      the entries comprise data that indicate a location within the array that stores a particular TU without including data that indicates which die of the plurality of dies of the array the TU is stored in; and
   a controller configured to:
      write TUs across a block stripe that includes a respective block of each of the plurality of dies, wherein:
         each of the TUs are only written to a single die of the plurality of dies;
         a write cursor indicates which respective block stripe of which respective die each of the TUs are to be written to; and
         a sub-write cursor indicates which location within the respective block stripe of the respective die to write each respective TU; and
      write the particular TU to a respective block of a die in the block stripe, wherein the particular TU is not written to the other dies in the block stripe.

2. The apparatus of claim 1, comprising a controller configured to use a hash function associated with each of the TUs to determine which of the TUs is written to which of a plurality of dies of the array.

3. The apparatus of claim 1, comprising a controller configured to write the TUs to a plurality of dies of the array without using the respective entry in the address mapping table.

4. The apparatus of claim 1, comprising the controller coupled to the array, wherein the controller is configured to write a first portion of a translation unit (TU) from a host to a first portion of memory, wherein the first portion of memory is in a first page of a first numbered block of a first group of planes of a first die of the array.

5. The apparatus of claim 4, wherein the controller is further configured to write a second portion of the TU from the host to a second portion of memory, wherein the second portion of memory is in a second page of the first numbered block of the first group of planes of the first die of the array.

6. The apparatus of claim 5, wherein the controller is further configured to write the second portion of the TU written subsequent to writing the first portion of the TU.

7. The apparatus of claim 5, wherein the controller is further configured to write the second portion of the TU without writing an additional TU between the first portion and the second portion.

8. The apparatus of claim 5, wherein the second portion is written physically sequential with the first portion.

9. The apparatus of claim 5, wherein the TU is written to the first die without a portion of the TU being written to an additional die.

10. A method, comprising:
determining which particular portion of an array of memory cells to write a translation unit (TU) using a corresponding entry in an address mapping table;
determining which particular die of a plurality of dies in the portion of the array to write the TU to without accessing the corresponding entry in the address mapping table;
and
writing:
TUs across a block stripe that includes a respective block of each of the plurality of dies, wherein:
each of the TUs are only written to a single die of the plurality of dies;
a write cursor indicates which respective block stripe of which respective die each of the TUs are to be written to; and
a sub-write cursor indicates which location within the respective block stripe of the respective die to write each respective TU; and
the particular TU to a respective block of a die in the block stripe, wherein the particular TU is not written to the other dies in the block stripe.

11. The method of claim 10, wherein the determining of which particular die to write the TU to comprises performing a hash function on a portion of the TU.

12. The method of claim 10, wherein writing the particular TU comprises writing a first portion of the TU to a first page of a first numbered block of a first plane of the particular die in the block stripe; and subsequent to writing the first portion, writing a second portion of the TU to a second page of the first numbered block of a second plane of the particular die.

13. The method of claim 12, comprising:
writing a first portion of an additional TU to a first page of the first numbered block of a first plane of a second die; and
subsequent to writing the first portion of the additional TU, writing a second portion of the additional TU to a second page of the first numbered block of a second plane of the second die.

14. The method of claim 10, wherein, in response to a portion of the TU being written across a final plane of a page, a next portion of the TU is written to a first plane of a next page.

15. The method of claim 14, wherein the final plane of the page and the first plane of the next page are within the particular die.

16. An apparatus, comprising:
an array of memory cells comprising a plurality of dies; and
a memory cache configured to store at least a portion of an address mapping table, wherein:
the address mapping table comprises entries that map translation units (TUs) to physical locations in the array, wherein at least one of the TUs is mapped to both a first page of a particular die of the plurality of dies and a second page of the particular die, and the entries comprise data that indicate a location within the array that stores a particular TU; and
a controller configured to:
use a hash function associated with each of the TUs to determine which of the TUs is written to which of the plurality of dies of the array;
write TUs across a block stripe that includes a respective block of each of the plurality of dies, wherein:
each of the TUs are only written to a single die of the plurality of dies;
a write cursor indicates which respective block stripe of which respective die each of the TUs are to be written to;
a sub-write cursor indicates which location within the respective block stripe of the respective die to write each respective TU; and
each of the TUs are written to their respective single die without reference to a last page written on a previous die; and
write the particular TU to a respective block of a die in the block stripe, wherein the particular TU is not written to the other dies in the block stripe.

17. The apparatus of claim 16, wherein the controller is further configured to determine which die to write each of the TUs to without using the respective entry in the address mapping table.

18. The apparatus of claim 16, wherein the entries do not include data that indicates which die of the array each of the TUs are stored in.

19. The apparatus of claim 16, wherein the controller is further configured to perform a combination of at least one of a multiplication operation and a shift operation to determine which of the TUs is written to which of a plurality of dies of the array.

20. The apparatus of claim 16, wherein the controller is further configured to:
write a first portion of a translation unit (TU) from a host to a first portion of memory, wherein the first portion of memory is in a first page of a first numbered block of a first group of planes of a first die of the array; and
write a second portion of the TU from the host to a second portion of memory, wherein the second portion of memory is in a second page of the first numbered block of the first group of planes of the first die of the array.

21. An apparatus, comprising:
an array of memory cells comprising:
a plurality of dies of memory, the plurality of dies each comprising a number of planes, the number of planes each comprising a number of blocks, the number of blocks each comprising a number of pages;
a controller coupled to the array, wherein the controller is configured to:
determine, using a hash function, which die of the plurality of dies to write each respective translation unit (TU) of a plurality of TUs to, wherein using the hash function randomizes which die is chosen to write each respective TU of the plurality of TUs to and reduces wear on any particular die of the plurality of dies;
write TUs across a block stripe that includes a respective block of each of the plurality of dies;
write each of the TUs to a respective block of a die in the block stripe, wherein
each of the TUs are only written to a single die of the plurality of dies and each of the TUs do not span more than the single die;

each of the TUs are not written to other respective dies in the block stripe;

a write cursor indicates which respective block stripe of which respective die each of the TUs are to be written to;

a sub-write cursor indicates which location within the respective block stripe of the respective die to write each respective TU; and each of the TUs are written to their respective single die without reference to a last page written on a previous die;

determine, using the hash function, that each of the TUs are located in their respective die; and read each of the TUs from their respective die.

22. The apparatus of claim 21, wherein the controller is further configured to not write any portion of the TU to an additional die.

23. The apparatus of claim 21, wherein the controller is further configured to determine an additional die to write an additional TU to using the hash function.

* * * * *